United States Patent [19]
Hashimoto et al.

[11] 3,799,380
[45] Mar. 26, 1974

[54] SCREW LIDS OR CROWN CAPS FOR BOTTLES HAVING IMPROVED SEALING GASKETS

[75] Inventors: Rikichi Hashimoto, Tokyo; Harunori Kamada, Toyonaka; Kazuo Fujimoto, Takatsuki; Tsutomu Kanaiwa, Takatsuki; Kiyoshi Iwasa, Takatsuki, all of Japan

[73] Assignees: Sumitomo Chemical Company Ltd., Osaka; Hashimoto Kogyo Co., Ltd., Tokyo, both of, Japan

[22] Filed: Dec. 27, 1971

[21] Appl. No.: 212,602

Related U.S. Application Data
[63] Continuation-in-part of Ser. No. 850,699, Aug. 14, 1969, abandoned.

[30] Foreign Application Priority Data
Aug. 18, 1968   Japan.............................. 43-58689
Dec. 26, 1968   Japan.............................. 43-96265

[52] U.S. Cl..................... 215/40, 161/42, 161/190, 260/77.5 AT, 264/268
[51] Int. Cl....................... B65d 23/02, B65d 53/04
[58] Field of Search ............ 264/240; 425/268, 130; 161/42, 190; 215/38, 39, 40

[56] References Cited
UNITED STATES PATENTS
3,442,411  5/1969  Mahoney............................. 215/40
3,591,532  7/1971  Abercrombie et al........ 260/2.5 AN
3,637,103  1/1972  Ptak.................................... 215/40
3,616,954  11/1971  Peck.................................... 215/40
3,697,485  10/1972  Rambosek et al........... 260/77.5 NC Primary Examiner—George F. Lesmes
Assistant Examiner—William R. Dixon, Jr.
Attorney, Agent, or Firm—Stevens, Davis, Miller & Mosher

[57] ABSTRACT

A gasket is prepared in a bottle cap by reacting in the bottle cap a first component containing a polyol having 2 or 3 hydroxyl functional groups in one molecule and a second component containing a polymethylene polyphenylisocyanate, preferably a quasi-prepolymer of a polymethylene polyphenylisocyanate having an isocyanate equivalent of not more than 300 until a cured substantially non-porous polyurethane gasket is obtained. The thus obtained seaing gasket undergoes neither deformation, color change nor weight loss over a prolonged period of time and has no tackiness on its surface.

4 Claims, 2 Drawing Figures

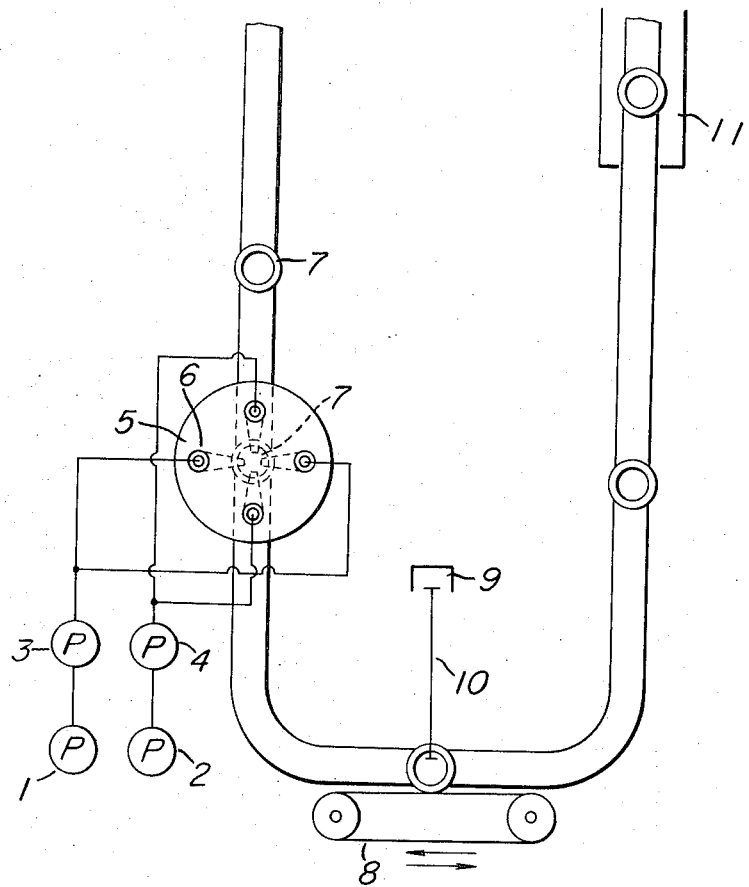
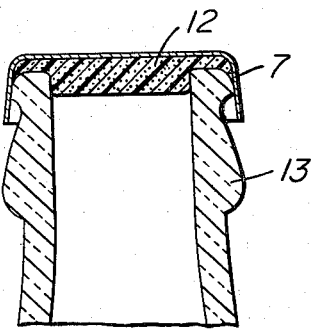

SCREW LIDS OR CROWN CAPS FOR BOTTLES HAVING IMPROVED SEALING GASKETS

This application is a Continuation-in-Part of our application Ser. No. 850,699, filed on Aug. 14, 1969 now abandoned.

This invention relates to a method for casing and fixing a sealing material to screw lids or crown caps and more particularly to a method for casting and fixing a substantially non-porous polyurethane gasket to screw lids or crown caps for bottles.

Leather, cork or rubber has been heretofore used extensively as a sealing gasket for a closure device such as a screw lid or crown cap for bottles. Usually the sealing gasket is inserted mechanically or manually into a metal cap after it has been previously punched out in desired size and configuration from sheet material. An adhesive substance is placed between the gasket and cap to adhesively bind them together. Such a method has the disadvantages that the scrap remaining after the gasket has been cut from the sheet is large, and the punching, inserting and fixing steps are troublesome.

In addition to the above sealing materials, it has been proposed to use gaskets of foamed thermoplastic resins. For example, foamed plasticized polyvinyl chloride and foamed polyethylene have been proposed. Such foamed gaskets are not entirely acceptable, however, because the hardness and modulus of elasticity thereof change with changes in temperature. Hence, a bottle capped during the summer or warm months of year frequently leaks in colder weather. Such a problem is particularly serious in the case of fresh drinks such as soda pop containing compressed carbon dioxide gas.

Japanese Patent Publications No. 3497/54 and No. 848/64 disclose methods for fixing an elastic sealing gasket to a bottle cap or the like by casting a polyvinyl chloride plastisol into a closure device and then heating the plastisol to solidify it. Such methods obviate the disadvantage of scrap loss inherent in the punching out process. However, the gasket has many disadvantages.

One of the problems is that an elevated temperature of at least 160°C is required to cure the plastisol. Such a high temperature during curing frequently causes a color change and heat deformation of a plastic cap so the polyvinyl chloride gasket is often impractical if the cap is made of plastic. Moreover, such a high curing temperature frequently anneals a metal cap sufficiently to make it too soft for sealing a bottle. Also, ink used on printed caps is sometimes discolored.

Another problem is that the plasticized polyvinyl chloride is a thermoplastic resin composition and thus undergoes wide changes in hardness and modulus of elasticity with change in temperature. Of particular disadvantage is an increase in hardness at a low temperature which reduces the sealing effectiveness of the gasket.

Still another disadvantage of gaskets prepared from a polyvinyl chloride plastisol is that the plastisol contains an amount as large as 40 to 120 PHR of low molecular weight plasticizers such as dioctyl phthalate in its composition. Such plasticizers are often extracted by the bottled contents. This is especially true if the bottle contains an oil or alcohol.

It is an object of this invention to provide a gasket for bottle caps and similar closures for bottles which is devoid of the foregoing disadvantages. A more specific object of the invention is to provide an improved synthetic resinous gasket and a novel method for casting the gasket in the bottle caps.

Other objects will become apparent from the following description with reference to the accompanying drawing in which:

FIG. 1 illustrates diagrammatically an apparatus for continuously casting a gasket in bottle caps; and FIG. 2 illustrates an embodiment of a bottle cap provided by the invention.

The objects of the invention are accomplished, generally speaking, by providing a bottle cap having a cured substantially non-porous polyurethane gasket cast therein and adhered thereto which is substantially resistant to deformation at temperatures of up to about 180°C and has a hardness and elasticity which are substantially uneffected by changes in temperature from 0°C to about 30°C. The polyurethane gasket has a hardness of from about Shore A 50° to 60°, a density of 0.9 to 1.2, a tensile strength of from about 20 to about 30 kilograms per square centimeter, an elongation at break of from about 90 to about 110 percent, a rebound elasticity of from about 36 to about 44 percent and preferably, a compression set of about 9 to 11 percent. The gasket is cast by reacting and curing a mixture containing, as essentially the only reactants, a polyol having two or three alcoholic hydroxyl groups and a polymethylene polyphenylisocyanate in the cover of the bottle cap. In a preferred process, the polyol and a quasi-prepolymer having an isocyanate equivalent of from about 180 to about 300 are mixed together, preferably in the cover, and reacted together until a cured thermoset polyurethane gasket is formed. The quasi-prepolymer is prepared by reacting a polyol having a molecular weight of from about 400 to about 3,000 with a polymethylene polyphenylisocyanate having an isocyanate equivalent of from about 125 to about 140 in proportions which provide a prepolymer having an isocyanate equivalent of from about 180 to about 300. As will be explained in more detail hereinafter, the usual chain extender need not be included in the reaction mixture and the reaction product may be cured at temperatures of 80°C. or less in the cap. Such low temperature curing enables curing in the cover without substantial distortion of a plastic cap or without significant annealing or softening of a metal cap.

A preferred embodiment of the present invention provides a method for fixing a sealing gasket to a bottle cap or similar closure device for a bottle which comprises uniformly mixing (1) a first component containing a polyol as the major component and fine powdery organic or inorganic fillers, a catalyst, pigments, and (2) a second component containing a quasi-prepolymer of diphenylmethane diisocyanate mixed with its polymers, adding the resulting mixture to a closure device, and further curing the same.

In carrying out the present invention, the polyurethane is prepared preferably by mixing 1.05 – 1.40 isocyanate equivalents of the second component with one hydroxyl equivalent of the polyhydroxyl compound in the first component.

The component (1) may be a polyhydroxyl compound alone or (2) a polyhydroxyl compound mixed with a catalylic amount, preferably 0.1 to 1 part by weight per 100 parts by weight of polyhydroxyl compound of a catalyst for the reaction between the polyol and polyisocyanate, or (3) a mixture of 1 or 2 with 10 to 70 parts by weight solid filler per 100 parts by weight of 1 or 2.

According to the present invention, a sealing gasket having a sufficient sealing effect and a good adhesiveness to the cover can be fixed to the cover only by casting liquid components into the cover such as a screwed lid or crown cap and curing the resulting reaction product at a low temperature. In this way, the problems heretofore encountered in preparing and using the closure device for a bottle have been solved. Both the first component and the second component of the present invention are low viscosity liquids and thus can be readily mixed, dosed and cast. Thus, there is no need at all for such labors as preparation of molded sheet material, punching and insertion of the gasket. The conventional method for casting a polyvinyl chloride plastisol may be used to cast a polyvinyl chloride gasket in a bottle cap. However, the cover of the cap itself will decompose, soften or deform at the temperatures of 170° to 190°C. required to cure the plastisol. Since the curing temperature required by the present invention is low, for example, ordinary room temperature of 16 to 20°C. or at most 80°C., the direct casting and molding of the gasket in the bottle cap can be effected. Moreover, the gasket will adhesively fix itself to the cover or cap.

It is a remarkable advantage of the present invention that complete curing can be effected at a temperature of 80°C. or less within a short period of time. Such an advantage can facilitate the maintenance of the heating device and reduce product defects such as uneven thickness brought about during the heating step. That is to say, when 150 g of the present composition as described in Example 1 are placed in a copper cylinder having an inner diameter of 60 mm and a height of 100 mm and the cylinder is immediately dipped in an oil bath at 80°C, a rotor of a Brookfield type viscometer, No. 4 is suspended at the center of the cylinder and rotated at six revolutions per minute to determine the change in viscosity, a rapid rise of viscosity is observed over a period of about 10 minutes, the fluidity is lost within 15 minutes and the composition is solidified.

On the other hand, when a typical polyvinyl chloride plastisol obtained by mixing 100 parts by weight of polyvinyl chloride paste resin (Sumilit PN: a tradename of Sumitomo Chemical Co., Limited) and 60 parts by weight of dioctylphthalate in a muller mixer is used, no indication of solidification is observed at all within 30 minutes at the same temperature. It is observed that when the polyvinyl chloride plastisol is heated in an oil bath at a temperature of 140°C. the viscosity rapidly rises over a period of about 15 minutes and solidification takes place within 20 minutes.

The resin phase of the gasket provided by the invention consists of cured polyurethane and does not contain any extractable material such as plasticizers. Extraction loss when the present product is contacted with water, an oil-in-water emulsion or an aqueous solution of alcohol is negligible.

The heretofore available polyvinyl chloride changes the sealing gasket appreciably in hardness with change in temperature, and also undergoes change in elasticity with change in hardness. Hence, when a closure device is to be secured to the mouth of a bottle only by crimping a flange of a steel cover thereabout as is the case with a crown cap, the sealing gasket must have a thickness predetermined according to the temperature conditions to which the bottle will become subjected. The gasket provided by the invention on the other hand does not undergo such changes in hardness and elasticity with change in temperature so it is not necessary to vary the thickness of the sealing gasket from season to season or from climate to climate.

For example, a comparison of hardness change of the prior art sealing gaskets and of the gasket of the invention are given in Table I. The values in Table I were determined by a rubber hardness meter according to the JIS K 6301 – 1962 procedure.

Table I

| Kind | Room Temperature | | | |
|---|---|---|---|---|
| | 30°C | 20°C | 5°C | 0°C |
| Foamed gasket of nonrigid polyvinyl chloride (apparent specific gravity: 0.5) | 58° | 63° | 70° | 75° |
| Foamed gasket of polyethylene (apparent specific gravity: 0.3) | 60° | 65° | 72° | 76° |
| Present gasket (Example 1) (apparent specific gravity: 1.0) | 60° | 60° | 60° | 59° |

The highest temperature to which prior art sealing gaskets of synthetic resin may be exposed safely are 80°C. for foamed polyvinyl chloride and about 70°C. for foamed polyethylene. Consequently, steam pasteurization of the contents of a bottle sealed with such a gasket will deform the gasket.

On the other hand, the deformation temperature of the gasket provided by the invention is about 180°C, and thus the present gasket can sufficiently withstand such high temperature treatment as steam pasteurization.

Further, the gasket of the invention is superior to a known polyurethane foam gasket in the following properties. The tensile strength of the foam gasket is 2 to 3 kg/cm$^2$ and the density thereof is 0.02 to 0.6, while the tensile strength of the gasket of the invention is 20 to 30 kg/cm$^2$ and the density thereof is 0.9 to 1.2. In addition, the known foam gasket is deformed in a very short time at 180°C., while the non-porous gasket provided by the invention is not deformed in such a short time as 2 to 3 min. at 180°C. though may be deformed when subjected to said temperature for a much longer time.

The first component of the present invention mainly comprises a polyol as the reactant but other materials such as a catalyst and filler may be added thereto.

Among the polyols usually used for polyurethane, the polyols having 2 or 3 hydroxyl functional groups in one molecule and molecular weights of 400 to 3,000 are preferably used in the present invention. For example, suitable polyols include polyoxypropylene glycol, the poly(oxypropylene)ether of trimethylolpropane, poly-(oxypropylene)ether of glycerol, etc. The gasket will have poor elasticity if polyols having more than 3 hydroxyl functional groups are used. In other words, a desirable gasket is not obtained when a polyol having more than 3 hydroxyl functional groups is used alone. Moreover, it is difficult to use a polyol having 2 or 3 alcoholic hydroxyl groups and a molecular weight of less than 400 alone, and when a polyol having a molecular weight of 4,000 is used, the gasket tends to remain tacky.

It is advantageous to premix the polyol with a fine powdery inorganic filler such as, for example, calcium carbonate, baryta, kaolin, clay, silica, aluminum silicate, talc, or the like, or an organic filler such as a resin powder in a Raikaiki mixer, a kneader, a Hobert mixer, a ball mill, an inkmill or other kneading apparatus for 10 to 60 minutes to sufficiently disperse and extend the fillers in the polyol.

The surface of a product becomes rough and the appearance is impaired when an agitator-mixer capable only of effecting counter current-flow movement is used, so a device capable of effecting agitation and milling at the same time should be used.

When the gasket is to be colored, a coloring agent or dye may be added to the polyol component.

A catalyst for reaction between the hydroxyl groups of the polyol and the polyisocyanate, for example, the tertiary amines, such as triethylene diamine, stannous octoate, lead octoate, dibutyltin dilaurate or other metal salts of organic acids may be added in a catalytic amount to the first component containing the polyol.

In order to obtain the physical properties set forth above, the polyisocyanate should be a mixture of diphenylmethane diisocyanate with its polymers. Crude diphenylmethane diisocyanate and polymethylene polyphenylisocyanate are examples of suitable commercially available polyisocyanates and are generally well known under the popular name of "crude MDI". That is, they are a mixture of a homologous series of diphenylmethane diisocyanate and its polymers generally shown by the following formula. The mixture whose mean functionality of isocyanate group is 2.2 to 3.0 is sometimes called "crude diphenylmethane diisocyanate" and the mixture whose mean functionality of isocyanate group exceeds 3.1 is called "polymethylene polyphenylisocyanate".

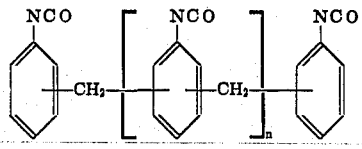

If a pure isocyanate such as tolylene diisocyanate or 4,4'-diphenylmethane diisocyanate is reacted with a polyoxypropyleneglycol having a molecular weight of 1,000 to 2,000 to prepare an elastomer, a curing agent is generally used to extend the polymer chain. If such extension of the polymer chain is not made, it is hard to obtain an elastomer having a good chemical resistance. That is to say, as described in J. H. Saunders, K. C. Frisch "Polyurethane Chemistry", Part II, Technology, page 341 et seq., the cross-linking agent generally used includes such aromatic diamines as 4,4'-methylene-bis(2-chloroaniline) and 3,3'-dichlorobenzidine and such lower molecular weight polyols as 1,4-butanediol and 1,2,6-hexanetriol. Said aromatic diamines have melting points of 109° – 110°C and 133°C respectively and thus have the disadvantage that they must be kept at a higher temperature.

When the polyoxypropyleneglycol having a molecular weight of 1,000 to 2,000 is allowed to react with pure polyisocyanate such as tolylenediisocyanate or 4,4-diphenylmethane diisocyanate and a lower molecular weight polyol such as 1,4-butanediol and 1,2,6-hexanetriol is used as a chain extender, fluctuation in quality is brought about unless the reaction conditions are strictly controlled, and a product having a poor quality is often formed. Such phenomena seem due to the readily formable disorder in molecular conformation within the formed polymer because the active groups of both the high molecular weight polyol and the curing agent are the same kind of hydroxyl groups and equally reactive with the polyisocyanate. In such an operation as casting into caps, it is necessary, in most cases, to mix the starting materials with a curing agent in an amount as small as several grams in the shortest period of time. Thus, the use of such a high viscosity prepolymer makes the operation difficult. Accordingly, it is advantageous, in most cases, to use a quasi-prepolymer containing unreacted polyisocyanate, but in such cases it is necessary to subject the principal polyol such as polyoxypropyleneglycol and a curing agent to reaction at the same time, and difficulty is brought about in the case of pure isocyanate when the lower molecular weight polyol such as 1,4-butanediol and 1,2,6-hexanetriol is used as a curing agent.

In accordance with the present invention it has been found that the mixing and casting operations can be effected in a bottle cap by using quasi-prepolymers of crude diphenylmethane diisocyanate or polymethylene polyphenylisocyanate and that an elastomer having excellent chemical resistance and suitable for use as a gasket in a bottle cap can be obtained without using a low molecular weight curing agent which is hard to handle.

It has been discovered that the elastomer obtained by allowing an 80:20 mixture of 2,4-tolylene diisocyanate and 2,6-tolylene diisocyanate to react with an equivalent amount of polyoxypropyleneglycol having a molecular weight of 1,000 to 2,000 and curing the product at 80°C for 1 hour without using a curing agent shows a swelling in volume over 600 percent when the elastomer is dipped in acetone at the ordinary room temperature for one week. However, an elastomer prepared at the same curing conditions according to examples of the present invention without a curing agent swells in volume only to about 100 percent when the elastomer is dipped in acetone at the ordinary room temperature for 1 week. Thus, it is found that an elastomer having good chemical resistance can be obtained without using a curing agent according to the present invention.

In carrying out the present invention, a one-shot process for directly mixing a polyisocyanate with a polyol component without prior preparation of a prepolymer can be used. However, when the curing is effected at a low temperature such as 80°C or lower, tackiness may remain on the surface of the product so it is often necessary to eliminate such tackiness by leaving it at room temperature for several hours to several days.

Crude diphenylmethane diisocyanate and polymethylene polyphenylisocyanate are commercially available as products having an isocyanate equivalent of 125 to 140. When such a product is mixed with polyoxypropyleneglycol having a molecular weight of 2,000 in a molar ratio of isocyanate groups to hydroxyl group of 1.05 : 1 in the presence of 0.2 part by weight per 100 parts by weight of polyhydroxy compound of stannous octoate, an elastomer can be obtained by curing at 70°C for 1 hour, but the surface of the elastomer has a considerable tackiness.

On the other hand, when a quasi-prepolymer having an isocyanate equivalent of 180 to 300, which has been obtained by mixing a polymethylene polyphenylisocyanate with a predetermined amount of polyoxypropylene glycol having a molecular weight of 2,000 in advance, and heating and cooling the mixture, is used and treated in the similar manner, the surface of the elastomer obtained by the treatment at 70°C for 1 hour has no tackiness at all. The prepolymer having an isocyanate equivalent exceeding 300 generally has a high viscosity and its casting becomes difficult. The prepolymer having an isocyanate equivalent below 150 is ineffective generally and the one which has an isocyanate equivalent between 150 to 180 indicates gradually increasing effect according to the isocyanate equivalent.

The amount of a sealing gasket to be fixed to a cap or screwed lid for a bottle depends upon the diameter of an opening of the bottle, but 0.5 to 1 g of a sealing gasket is enough for one bottle usually used for beverage or chemicals.

Those mixtures which have a pot life which is sufficiently long, for example, 10 minutes or more after the first component and the second component have been mixed may be mixed batchwise or continuously, and cast into a bottle cap cover after dosage, and then cured by heating. In such a case, the ordinary two-component metering and mixing apparatus can be used.

The pot life of a mixture after mixing can be made short to from 10 seconds to 10 minutes by properly selecting the kind and amount of the polyol and the catalyst. Generally, there is a tendency to shorten the time required for curing by shortening the life of a mixture, but in such a case there is the danger of solidification of the mixture within the mixer, and thus it is necessary to avoid prolonged retention of the mixture in the mixer.

When prolonged retention of the mixed components occurs, the mixed components of a two-component curable system start to solidify and finally the viscosity increases to the point that there is failure to discharge and the entire apparatus must be overhauled.

Referring now to the accompanying drawing, FIG. 1 is a schematic diagram illustrating one example of a highly efficient apparatus for casting a two-component curable system into a closure device such as a screwed lid or crown cap; and FIG. 2 illustrates an embodiment of the bottle cap provided by the invention.

The first component containing the polyol and the second component containing the quasi-prepolymer are discharged from storage tanks 1 and 2 to metering pumps 3 and 4 respectively, and then are led to a discharge nozzle 6 of a mixing head 5 and discharged. A crown cap 7 is moved by a continuous belt under the discharge nozzle 6 and the pumps 3 and 4 are actuated to discharge the components into the crown cap 7 at a constant rate. Further, the crown cap 7 is vibrated and/or rotated by a vibrating mechanism and/or a rotating mechanism 8 to promote the mixing. At that time, an agitating arm 10, to which gentle vibration is given by an electromagnet 9, is placed within the crown cap to effect uniform mixing. The mixture is heated together with the crown cap 7 in an oven 11 at 20° to 80°C and then cooled, whereby an elastic sealing gasket 12 is fixed to the crown cap. The formulations of the Working Examples may be used in this process. The bottle cap having cover 7 and gasket 12 may be crimped over the mouth of a bottle 13, as illustrated in FIG. 2.

The metering pump used in the present invention may be of gear type, vane type, or plunger type, but it is desirable to use a plunger type pump having a cylinder capacity of 1 to 10 ml.

Further, it is desirable to provide the discharge nozzle for the first component and that for the second component in a relatively close position and to provide as many nozzles as possible.

In the vibrating and/or rotating mechanism 8, it is effective to use reciprocal rotation by a crank and electromagnetic vibration at the same time. The air bubbles entrained at the discharge nozzle 6 are removed by such device and mixing of the components is sufficiently effected at the same time.

There is a considerable difference between the amount of the first component and that of the second component, and sometimes compatibility is poor between these components. In such a case, mixing can be completely effected by placing a small stainless steel wire, to which fine vibration is given, into a liquid phase within the cap.

The present invention is hereinafter explained with reference to the following examples which are not intended to limit the invention.

Example 1

80 g of polyoxypropyleneglycol (P-2000: a tradename of Asahi Denka Kogyo K.K. Japan, hydroxyl value: 57.3) having an average molecular weight of 2,000, 20 g of polyoxypropyleneglycol (P-1000: a tradename of Asahi Denka Kogyo K.K., Japan, hydroxyl value: 110) having an average molecular weight of 1,000, 0.2 g of stannous octoate, and 50 g of dried kaolin clay were mixed for 15 minutes in a Raikaiki mixer, and deaerated. The resulting deaerated mixture was used as the first component.

Polymethylenepolyphenyl isocyanate (Papi: a tradename of Upjohn Co., U.S.A., mean functionality, 3.1) was used as the second component.

150 g of the first component and 17.3 g of the second component were mixed for about two minutes in a 500 cc glass beaker by means of a stirrer, and 0.5 g of the mixture was cast into the hollow concave part of a punched thin steel plate crown cap having a diameter of 22 mm, a height of 5 mm and a thickness of 0.12 mm and immediately heattreated at 60°C for 1 hour. The cast gasket had a slight tackiness after the heat treatment, but the tackiness disappeared after 4 to 8 hours at ambient temperature and humidity.

The thus obtained crown cap was secured to a glass bottle having a content of 630 cc and a mouth corresponding to the crown cap filled with a 5 percent ethyl alcohol aqueous solution containing 0.02 percent of Edible Red Pigment No. 2 by the usual capping means, and the capped bottle was laid down as a specimen. Twelve specimens stored in an atmosphere of −10°C for 1 week and further at an atmosphere of +40°C for 1 week were inspected, but no leakage of the content, deformation, color change or damage of the gaskets could be detected.

Example 2

80 g of polyoxypropyleneglycol having a mean molecular weight of 2,000 (the same as in Example 1), 15 g of polyoxypropyleneglycol having a mean molecular weight of 1,000 (the same as in Example 1), 5 g of the poly(oxypropylene)ether of glycerol (GY-3000: a tradename of Asahi Denka Kogyo K.K., Japan, hydroxyl value: 56.4), 40 g of dried talcum powder, and 0.2 g of stannous octoate were mixed in a Raikaiki mixer for 15 minutes and deaerated. The deaerated mixture was used as the first component.

Crude diphenylmethane diisocyanate (Isonate 390 P: a tradename of Upjohn Co., U.S.A., average functionality: 2.2) was used as the second component.

140 g of the first component and 17 g of the second component were mixed for about 2 minutes in a 500 cc glass beaker.

The resulting mixture was cast into a crown cap in the same manner as in Example 1, and immediately heat-treated at 50°C for 3 hours and left for 4 hours under ambient temperature and humidity.

The thus obtained product was secured to a glass bottle having the same shape and filled with the same content as in Example 1.

The thus prepared 12 specimens were dipped in boiling water for 15 minutes and stored in the normal state for 1 month, and were then inspected. No leakage, deformation, damage or significant coloring of the gasket could be detected.

Example 3

200 g of polyoxypropyleneglycol having a mean molecular weight of 2,000 (the same as in Example 1), 200 g of dried kaolin clay and 0.4 g of stannous octoate were kneaded in a Raikaiki mixer having a capacity of 5 liters for 15 minutes, and then 200 g of polyoxypropyleneglycol having a hydroxyl value of 57.3 were added thereto. The mixture was then uniformly mixed, and deaerated by pressure reduction, and the thus obtained mixture was used as the first component.

58.4 g of polyoxypropyleneglycol having a hydroxyl value of 57.3 and a mean molecular weight of 2,000 were added to 200 g of polymethylene polyphenylisocyanate having an isocyanate equivalent of 133.5 (the same as in Example 1), and the mixture was heated at 70°C for 1 hour in the presence of a nitrogen gas stream, and the resulting prepolymer having an isocyanate equivalent of 180 was used as the second component.

100 g of the first component and 17.5 g of the second component were uniformly mixed, and 1 g of the mixture was cast into a polypropylene screwed lid having an inner diameter of 20 mm and an inner height of 13 mm and heat-treated at 70°C for 1 hour. Neither thermal deformation nor color change had occurred after the heat treatment. Further, the sealing gasket was not tacky.

When the heat treatment was conducted at less than 20°C, complete curing of the sealing gasket was not effected even after 24 hours, and the sealing gasket was tacky.

The screwed lid heat-treated at 70°C for 1 hour was secured to a glass bottle having a capacity of 500 ml, which was filled with 5 percent aqueous ethyl alcohol, and the bottle was stored at 0°C for 7 hours, and further at 40°C for 7 days. No leakage of the bottle contents, no deformation, damage or color change of the sealing gasket could be detected.

Example 4

180 g of polyoxypropyleneglycol having a mean molecular weight of 2,000 (the same as in Example 1), 20 g of poly(oxypropylene)ether of trimethylolpropane having a mean molecular weight of 2,500 (T-2500: a tradename of Asahi Denka Kogyo K.K.: hydroxyl value: 67), 100 g of dried talcum powder, and 0.3 g of stannous octoate were uniformly mixed in a Raikaiki mixer and deaerated. The deaerated mixture was used as the first component.

83.8 g of polyoxypropyleneglycol having a mean molecular weight of 2,000 were added to 200 g of crude diphenylmethane diisocyanate (Desmodur 44 V: a tradename of Farbenfabriken Bayer, Germany; average functionality: 2.6 – 2.8) and heated at 70°C for 1 hour in the presence of a nitrogen gas stream, and the thus obtained prepolymer having an isocyanate equivalent of about 200 was used as the second component.

100 g of the first component and 25 g of the second component were uniformly mixed, and 1 g of the thus obtained mixture was cast into an aluminum screw lid having an inner diameter of 20 mm and an inner height of 13 mm, and heat-treated at 70°C for 30 minutes. The heat-treated screw lid was tested in the same manner as in Example 3, and as a result, no leakage of the bottle content, deformation, color change or damage of the sealing gasket could be detected.

Example 5

The same first component as in Example 3 was used. A quasi-prepolymer having an isocyanate equivalent of 180, which was prepared by adding 65.0 g of polyoxypropyleneglycol having a hydroxyl value of 57.3 to 200 g of crude diphenylmethane diisocyanate having an isocyanate equivalent of 130 (Isonate 390 P, a tradename of Upjohn, U.S.A.) and treating the mixture in the same manner as in Example 3, was used as the second component.

100 g of the first component and 17.5 g of the second component were uniformly mixed, and 0.5 g of the mixture was cast into a crown cap made from the punched thin steel sheet (inner diameter: 22 mm, inner height: 5 mm, thickness: 0.12 mm) and heat-treated at 70°C for 1 hour. The crown cap was secured, after heat treatment and cooling, to a glass bottle having a capacity of 630 cc and an opening which mates with said crown cap, and filled with an ethyl alcohol aqueous solution containing 0.02 percent by weight Edible Red Pigment No. 2 by means of the ordinary device. The thus obtained three test bottles were stored at a temperature of −10°C for 1 week and then at a temperature of +40°C for 1 week. No leakage of the contents, color change or deformation of the sealing gasket was found.

Example 6

A first component was prepared from 100 g of (polyoxypropylene) ether of glycerol having a mean molecular weight of 3,000 (the same as in Example 2), 100 g of polyoxypropyleneglycol having a mean molecular weight of 1,000 (the same as in Example 1), 0.4 g of stannous octoate and 200 g of dried kaolin clay in the same manner as in Example 1 and the same second component as in Example 3 was used.

The first component and the second component were cast into a polypropylene screw lid having an inner diameter of 20 mm and an inner height of 13 mm through discharge nozzles each having a diameter of 0.5 mm and being arranged for each component by means of plunger pumps having discharge amounts of 0.5 cc and 0.125 cc per shot respectively under a back pressure of 15 kg/cm$^2$.

The screw lid was held by a steel holder and while the holder was rotated at 200 rpm maximum, the rotating direction was changed every 5 seconds. After such treatment was conducted for 3 seconds, the holder was placed in an electromagnetic field, and electromagnetic vibration was given to the holder according to the usual manner, and degassing was effected by fine vibrations of the holder, Then, the screw lid was heated in a hot air circulating oven at 80°C for 40 minutes and then left to cool. The thus obtained screw lid was subjected to 5 percent aqueous ethyl alcohol leakage test in the same manner as in Example 3. As a result, no leakage of the contents could be detected. Further, neither deformation, damage nor color change of the sealing gasket could be detected.

Example 7

180 g of polyoxypropyleneglycol having a mean molecular weight of 2,000 (the same as in Example 1), 20 g of poly(oxypropylene)ether of trimethylolpropane (the same as in Example 4), 100 g of dried talcum powder and 1.0 g of stannous octoate were uniformly mixed in a Raikaiki mixer and deaerated. The deaerated mixture was used as the first component, and the same second component of Example 4 was used.

100 g of the first component and 29 g of the second component were uniformly mixed, and 1 g of the thus obtained mixture was cast into an aluminum screw lid having an inner diameter of 20 mm and an inner height of 13 mm, and allowed to stand at room temperature (16 - 20°C) for 24 hours, whereby the mixture was solidified and the tackiness of the surface had disappeared. The thus obtained screw lid was tested in a way similar to that of Example 3. No leakage of the bottle contents was observed, and neither deformation damage nor color change of the sealing gasket was observed.

Although the invention has been described in detail for the purposes of illustration, such detail is solely for that purpose and variations can be made by those skilled in the art without departing from the spirit and scope of the invention except as it may be limited by the claims.

What is claimed is:

1. A bottle cap comprising a cap member and a cured, substantially non-porous, substantially non-cellular, substantially non-tacky polyurethane gasket comprising a material reacted and cured at a temperature of up to 80°C cast in the cap member and self-adhered thereto comprising a polyol having 2 to 3 hydroxyl groups and a molecular weight of from 400 to about 3,000 and a polymethylene polyphenylisocyanate, said gasket being substantially resistant to deformation at temperatures of up to about 180°C and of improved resistance to swelling in acetone and having an elasticity and hardness which are substantially constant through a temperature range of from about 0°C to about 30°C, said hardness being from about shore A 50° to about shore A 60°, a density of 0.9 to 1.2, a tensile strength of from about 20 to about 30 kilograms per square centimeter, an elongation at break of from about 90 to about 110 percent and a rebound elasticity of from about 36 to about 44 percent.

2. The bottle cap of claim 1 wherein the gasket contains an inorganic filler dispersed substantially uniformly therein.

3. The bottle cap of claim 1 wherein the gasket has a specific gravity of about 1.

4. The bottle cap of claim 2 wherein said polyol is mixed prior to transfer to the cap member with an inorganic filler and a catalytic amount of a catalyst for its reaction with a polyisocyanate, and the polymethylene polyphenylisocyanate has been reacted prior to transfer to the cap member with a polyol having from 2 to 3 hydroxyl groups and a molecular weight of from about 400 to about 3,000 to form a quasi-prepolymer having an isocyanate equivalent of from about 180 to about 300.

* * * * *